Figure 1:
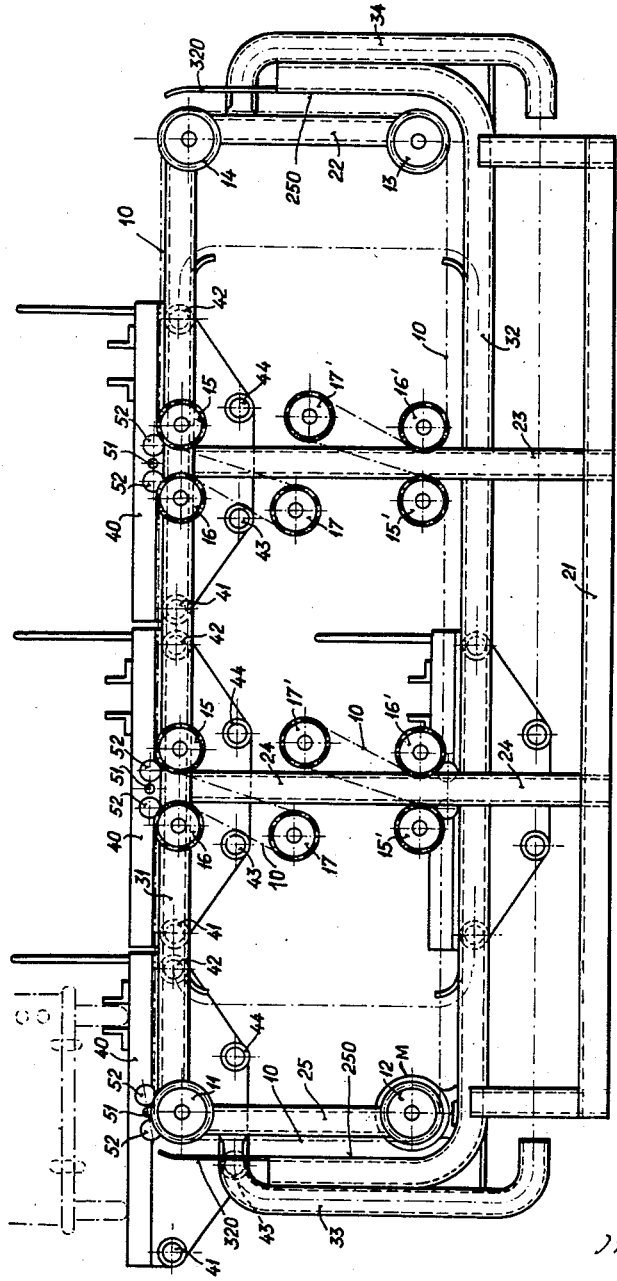

Jan. 19, 1965   J. P. SONDEREGGER   3,166,180
AUTOMOBILE PARKING MECHANISMS
Filed April 3, 1962   5 Sheets-Sheet 1

Inventor
Jean Pierre Sonderegger
by
Michael S. Striker
Attorney

Inventor
Jean Pierre Sonderegger
by Michael S. Striker
Attorney

Jan. 19, 1965   J. P. SONDEREGGER   3,166,180
AUTOMOBILE PARKING MECHANISMS
Filed April 3, 1962   5 Sheets-Sheet 3

Inventor
Jean Pierre Sonderegger
by Michael S. Striker
Attorney

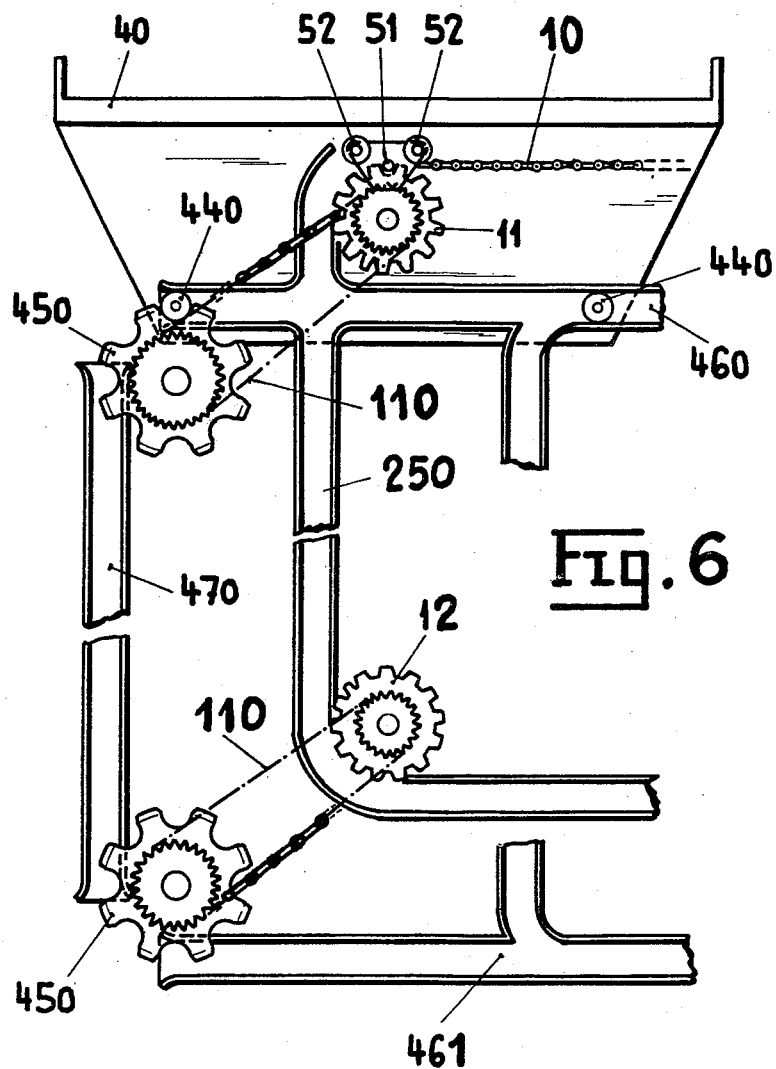

United States Patent Office 3,166,180
Patented Jan. 19, 1965

3,166,180
AUTOMOBILE PARKING MECHANISMS
Jean-Pierre Sonderegger, Flughafenstrasse 8,
Basel, Switzerland
Filed Apr. 3, 1962, Ser. No. 184,879
Claims priority, application Switzerland, Apr. 7, 1961,
4,062/61
13 Claims. (Cl. 198—85)

The present invention relates to an automobile parking mechanism comprising a plurality of platforms in operation intermittently moving each parallel to itself in a rectangular circuit positioned in a vertical plane.

The invention has the primary object of providing an automobile parking mechanism wherein the total space occupied per platform, i.e. per parkable automobile, is a minimum. It is also an object of the invention to provide an automobile parking mechanism of this kind, wherein the short sides of the rectangular circuit need not be longer than the width of an automobile for an upright positioning of the rectangle, or the height of an automobile for a lying positioning of the rectangle. It is yet another object of the invention to provide an automobile parking mechanism of the kind referred to, wherein collision between the roof portions of the automobiles parked thereon with adjacent platforms is safely prevented at the points of transition from one long side of the circuit via a short side to the other long side.

With these and other objects in view which will become apparent later from this specification and the accompanying drawings, I provide a parking mechanism for automobiles comprising in combination: a stationary structure, a plurality of platforms or platform carriages in operation moving intermittently, each parallel to itself, in unit steps along a rectangular circuit positioned in a vertical plane on said structure, said circuit having two diagonally opposite corners simultaneously unoccupied by platforms, and intermediate stopping points for said platforms along the two long sides of said circuit, an endless conveyer member in operation conveying said platforms along said circuit, driving members or first coupling means arranged on said conveyer member capable of engaging said platforms, deflector means arranged on said structure at said intermediate stopping points disengaging said driving members from second coupling means on said platforms and guiding the same over a detour of a total length corresponding to the short sides of said rectangular circuit, said driving members, after said detours, re-engaging said platforms.

Figure 2:
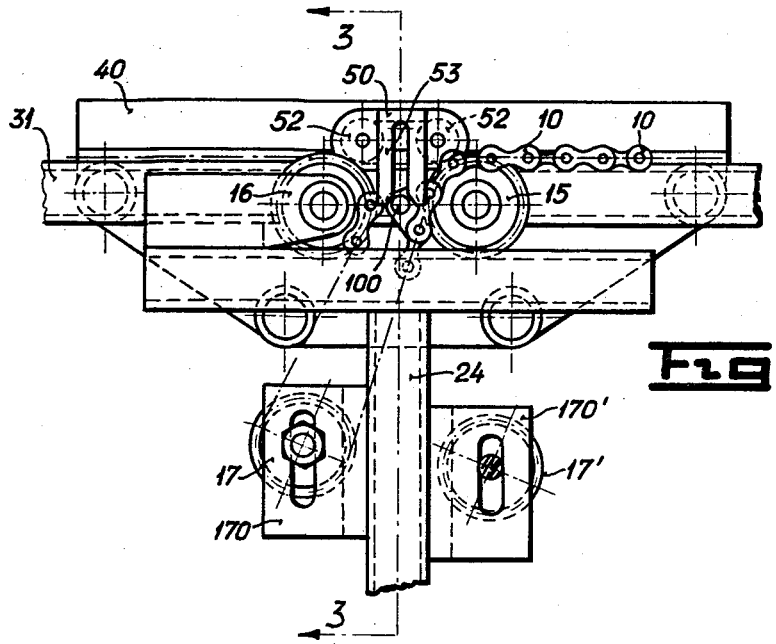
Figure 3:
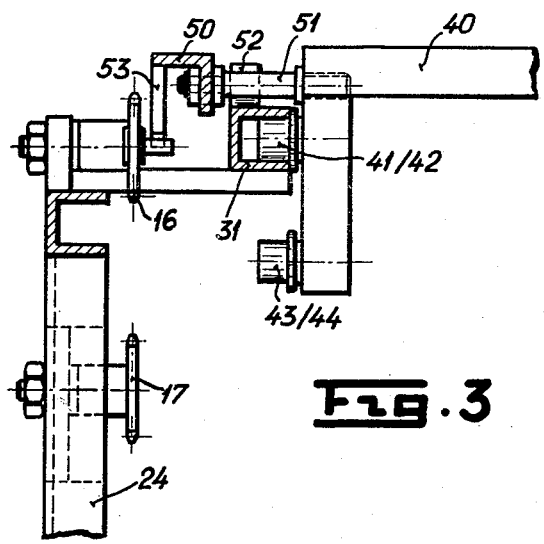
Figure 4:
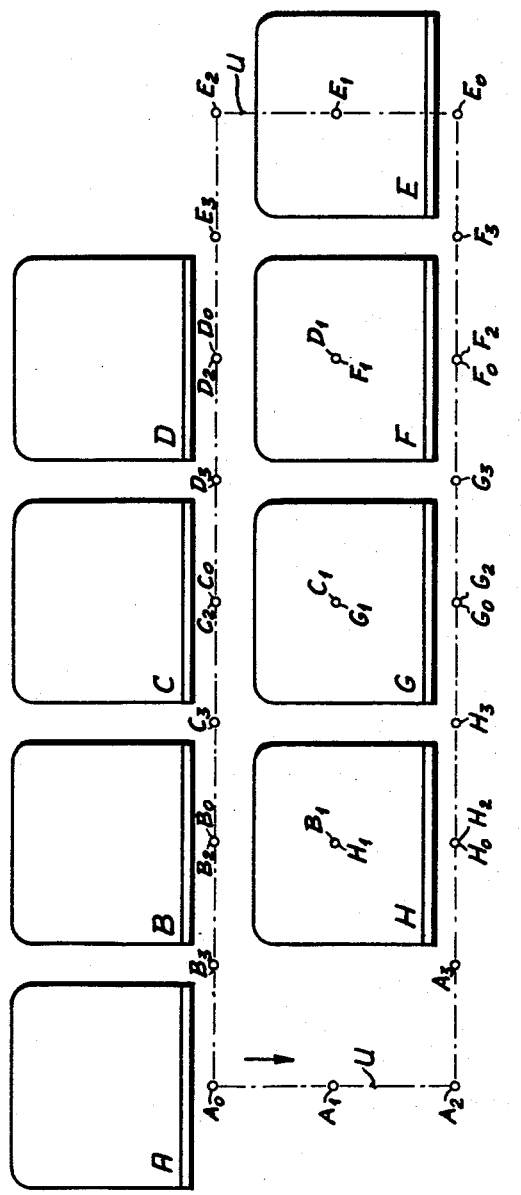

These and other features of my said invention will be clearly understood from the following description of a preferred embodiment of my said invention and of modifications thereof, given by way of example with reference to the accompanying drawings, in which:

FIG. 1 is an elevation,
FIG. 2 is a detail of FIG. 1 on a larger scale,
FIG. 3 is a section on the line 3—3 of FIG. 2.
FIG. 4 is a diagrammatic representation of the device according to the FIGS. 1 to 3,
FIG. 5 is a diagrammatic representation of a modification with the rectangular circuit positioned upright,
FIG. 6 is an elevation of a modification with simplified guidance means on the detours.

According to FIG. 1, four main deflector rollers or sprocket wheels 11, 12, 13, 14 for a motor driven endless conveyer means 10 (indicated in chain-dotted lines), e.g. a chain, are arranged at the four corners of a rectangular circuit arranged in a vertical plane on corresponding supports of a carrier structure, including for example the struts 21, 22, 23, 24. A drive motor M for driving the conveyer chain 10 may be coupled to the shaft of any of the main sprocket wheels and the motor M is schematically indicated in FIG. 1 arranged coaxially with and connected to the shaft of sprocket wheel 12. An upper horizontal guide rail 31 and a lower horizontal guide rail 32 serve for the guidance of upper rollers 41, 42 of the platforms 40, and two lateral transition guide rails 33, 34 serve for the guidance of two lower runners 43, 44 of the platforms 40.

The lower guide rails 32 are turned up at their lateral ends, and their vertical extensions 320 serve, in a manner to be explained later, for the deflection of pivotally mounted coupling means. With further reference to the FIGS. 2 and 3 it will now be described how on each platform a coupling means is mounted pivotable through 360°. The platforms each carry a pivot pin 51 for the body 50, which carries two rollers 52 running in succession, which according to FIGS. 2 and 3 run on the top of the guide rail 31. Each rocker body 50 carries a fork 53 opening inwardly, which is designed for co-operating with a driving pin 100 on some links of the chain 10 in such a manner that the platform concerned is conveyed along by the chain, as long as this driving pin 100 engages into the fork 53 of the coupling concerned.

In the FIGS. 2 and 3 a platform 40 is shown at an intermediate stopping point on the upper longitudinal side of the rectangular circuit. At each of these intermediate stopping points two deflector rollers 15, 16 and a further deflector roller 17 for the conveyer chain are so arranged, that at each of them the conveyer chain is passed over a deflector loop into the interior of the rectangular circuit, so that the driving pin 100, which engages with the fork 53, will be first disengaged from the latter, and re-engaged with the same only later. During this period, while the driving pin is disengaged, the platform concerned remains at a standstill while the chain keeps running, and begins to move along only when the driving pin again engages into the fork 53. The coupling 50 remains standing in an unchanged rotational position, since its orientation is determined by the horizontal run of the guide face for the runners 52.

According to FIG. 1 it is assumed that at the left hand side upper corner, i.e. at the deflector roller 11, the rectangular circuit for the rollers 52 ends, and through an arc makes transition into a vertical guide track 250 for these rollers, so that there the coupling 50 is turned 90° about the pin 51. The platform 40 is however kept parallel to itself by its leading lower guide roller 43 entering into the transition rail 33 while its leading upper guide roller 41 leaves the guide rail 31. At this moment also the trailing upper guide roller 42 of the platform is freed, and the platform 40 follows in a horizontal position the left hand side vertical stretch of the rectangular circuit. Below the lower deflector roller 12 the lower guide roller 43 emerges again from the transition rail 33, and instead, the guide roller 42 enters into the lower guide rail 32. On the opposite side the deflection is effected mirror-symmetrically. At each corner of the rectangular circuit the coupling concerned is turned through 90° about its pivot pin 51. At the lower longitudinal side of the rectangular circuit the rollers 52 of the couplings are guided on top of the lower guide rail 32. Likewise, inwardly directed loops of the conveyer means 10 are formed at the intermediate stopping points on the lower part of the carrier structure by deflector rollers 15', 16', 17'. The rollers 17, 17' are adjustable in elongated holes of brackets 170, 170', respectively, in order that the total length of the loops may be adjusted each to a predetermined value.

With reference to FIG. 4, the principle of action of such a guidance of the platform will now be explained: Eight platforms A–H are here arranged on a rectangular circuit U, in such a manner, that any two diagonally opposite corners of the circuit are left unoccupied, while the platforms follow one another closely at the longitudinal sides. A*o*, B*o* ... H*o*, denote the stopping points of the associated driving pin 100 of the conveyor chain, respectively. When the platforms are to be advanced one or more places, in order that e.g. the platform A loaded with a car makes place for a subsequent still empty platform, the chain 10 is set in motion. Then the carrier pin for the platform A moves from the point A*o* through the points A1, A2, A3 to the point where previously the carrier pin H*o* of the platform H had been. The driving pin of the platform B on the other hand moves meanwhile from the position B*o* firstly to the internal deflection point B1, from there back to B2, which point co-incides with B*o*, and only then via the intermediate point B3 to the place, where the point A*o* had been previously.

The platform B accordingly starts moving in the direction of the circuit only when the platform A has arrived at the point A2, and is therefore out of the trajectory of the platform B. Likewise the platforms C, D and F, G, H are first at standstill, and move only subsequently to the next place, while the platform E moves towards the corner opposite of that of the platform A.

In this manner it is possible to make the short vertical sides of the circuit only as high as indispensible in view of the height of the cars. The lengths of the detour loops B*o*, B1, B2, C*o*, C1, C2 ... H*o*, H1, H2 have to correspond approximately to the lengths of these short sides.

Figure 5:
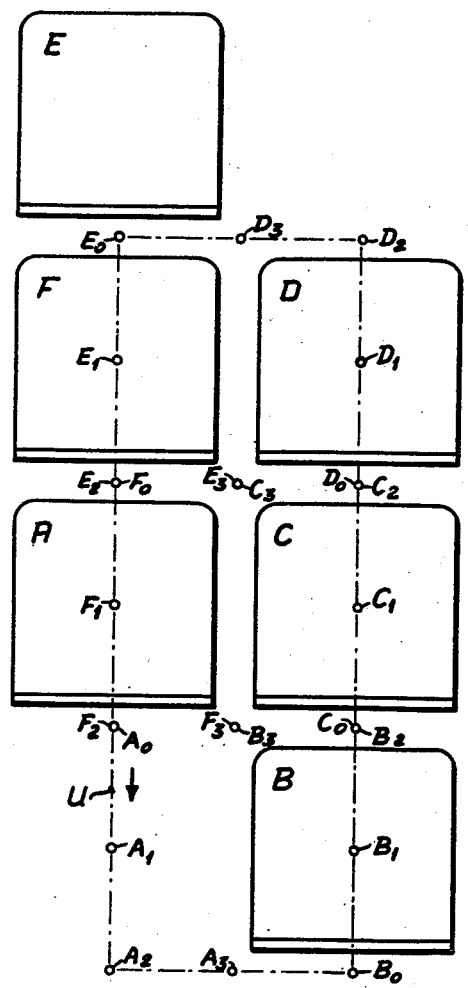

When an upright arrangement of the rectangular circuit is provided according to FIG. 5, the motion phases and detour loops have to be laid out according to the sequence of points indicated there.

In FIG. 1 for example the left hand side upper corner of the rectangular circuit is to be provided as the loading- and unloading point, respectively, of the circuit.

According to the modification of FIG. 6, at the deflector points the leading pins or roller 440, respectively, come into engagement with rotatable sprocket wheels 450 at the undersides of the platforms 40. These sprocket wheels 450 take over the pins 440 at the outlet of the horizontal guide tracks 460, 461 and guide them from the vertical guide tracks 470 again into the horizontal guide tracks 460, 461. Advantageously the transition sprocket wheels 450 are driven at the same circumferential speed as the conveyor chain 10, for example by means of a belt- or chain-drive 110 from the wheel 11 or 12, respectively.

While I have herein described and illustrated in the accompanying drawings what may be considered to be typical and particularly useful embodiments of my said invention, I wish it to be understood that I do not limit myself to the particular details and dimensions described and illustrated; for obvious modifications will occur to a person skilled in the art.

What is claimed as new and desired to be protected by Letters Patent is:

1. A parking mechanism for automobiles or the like comprising, in combination, a stationary structure defining a rectangular path having a pair of substantially horizontal portions and a pair of substantially vertical portions; a plurality of platform carriages arranged on said stationary structure for movement parallel to themselves along said rectangular path and in such a manner that two diagonally opposite corners of said path are simultaneously unoccupied; and drive means for moving said platform carriages along said path and including endless flexible conveyor means, a plurality of first coupling means, one for each platform, fixed spaced from each other to said endless flexible conveyor means, a plurality of second coupling means respectively fixed to said platform carriages and respectively adapted to be engaged by said first coupling means for coupling said platform carriages to said conveyer means, guide means for guiding at any instant a plurality of first portions of said endless flexible conveyer means substantially parallel to said rectangular path for keeping thereby the first coupling means fixed to said first portions of said conveyer means engaged with the respective second coupling means, a plurality of deflector means respectively arranged along spaced points of said horizontal portions of said path for deflecting a plurality of second portions of said endless flexible conveyer means transversely with respect to said first portions for disengaging the first coupling means fixed to said second portions from the respective second coupling means, and moving means connected to said endless flexible conveyer means for continuously moving the same along said guide and deflector means.

2. A parking mechanism for automobiles or the like comprising, in combination, a stationary structure defining a rectangular path having a pair of substantially horizontal portions and a pair of substantially vertical portions shorter than said horizontal portions; a plurality of platform carriages arranged on said stationary structure for movement parallel to themselves along said rectangular path and in such a manner that two diagonally opposite corners of said path are simultaneously unoccupied; and drive means for moving said platform carriages along said path and including endless flexible conveyer means, a plurality of first coupling means, one for each platform, fixed spaced from each other to said endless flexible conveyer means, a plurality of second coupling means respectively fixed to said platform carriages and respectively adapted to be engaged by said first coupling means for coupling said platform carriages to said conveyer means, guide means for guiding at any instant a plurality of first portions of said endless flexible conveyer means substantially parallel to said rectangular path for keeping thereby the first coupling means fixed to said first portions of said conveyer means engaged with the respective second coupling means, a plurality of deflector means respectively arranged along spaced points of said horizontal portions of said path for deflecting a plurality of second portions of said endless flexible conveyer means transversely with respect to said first portions for disengaging the first coupling means fixed to said second portions from the respective second coupling means, said second portions having each a total length substantially equal to the length of said vertical portions, and moving means connected to said endless flexible conveyer means for continuously moving the same along said guide and deflector means.

3. A parking mechanism for automobiles or the like comprising, in combination, a stationary structure defining a rectangular path having a pair of substantially horizontal portions and a pair of substantially vertical portions shorter than said horizontal portions; a plurality of platform carriages arranged on said stationary structure for movement parallel to themselves along said rectangular path and in such a manner that two diagonally opposite corners of said path are simultaneously unoccupied; and drive means for moving said platform carriages along said path and including endless flexible conveyer means, a plurality of first coupling means, one for each platform, fixed spaced from each other to said endless flexible conveyer means, a plurality of second coupling means respectively fixed to said platform carriages and respectively adapted to be engaged by said first coupling means for coupling said platform carriages to said conveyer means, guide means for guiding at any instant a plurality of first portions of said endless flexible conveyer means substantially parallel to said rectangular path for keeping thereby the first coupling means fixed to said first portions of said conveyer means engaged with the respective second coupling means, a plurality of deflector means respectively arranged along spaced points of said horizontal portions of said path or deflecting a plurality of second portions of said endless flexible conveyer means transversely with respect to said first portions for disengaging the first coupling means fixed to said second portions from the respective second coupling means, said second portions having each a total length substantially equal to the length of said vertical portions, each of said deflector means including three rotary deflector means two of which are mounted closely spaced from each other along said horizontal portions of said path and the third being arranged between and vertically spaced therefrom so that each of said second portions of said endless flexible conveyer means forms a loop extending transversely and substantially vertical to said horizontal portions of said path, and moving means connected to said endless flexible conveyer means for continuously moving the same along said guide and deflector means.

4. A parking mechanism for automobiles or the like comprising, in combination, a stationary structure defining a rectangular path having a pair of substantially horizontal portions and a pair of substantially vertical portions shorter than said horizontal portions; a plurality of platform carriages arranged on said stationary structure for movement parallel to themselves along said rectangular path and in such a manner that two diagonally opposite corners of said path are simultaneously unoccupied; and drive means for moving said platform carriages along said path and including endless flexible conveyer means, a plurality of first coupling means, one for each platform, fixed spaced from each other to said endless flexible conveyer means, a plurality of second coupling means respectively fixed to said platform carriages and respectively adapted to be engaged by said first coupling means for coupling said platform carriages to said conveyer means, guide means for guiding at any instant a plurality of first portions of said endless flexible conveyer means substantially parallel to said rectangular path for keeping thereby the first coupling means fixed to said first portions of said conveyer means engaged with the respective second coupling means, a plurality of deflector means respectively arranged along spaced points of said horizontal portions of said path for deflecting a plurality of second portions of said endless flexible conveyer means transversely with respect to said first portions for disengaging the first coupling means fixed to said second portions from the respective second coupling means, said second portions having each a total length substantially equal to the length of said vertical portions, each of said deflector means including three rotary deflector means two of which are mounted closely spaced from each other along said horizontal portions of said path and the third being arranged between said two deflector means and between said horizontal portions so that each of said second portions of said endless flexible conveyer means forms a loop extending from one toward the other of said horizontal portions of said path, and moving means connected to said endless flexible conveyer means for continuously moving the same along said guide and deflector means.

5. A parking mechanism for automobiles or the like comprising, in combination, a stationary structure defining a rectangular path having a pair of substantially horizontal portions and a pair of substantially vertical portions shorter than said horizontal portions; a plurality of platform carriages arranged on said stationary structure for movement parallel to themselves along said rectangular path and in such a manner that two diagonally opposite corners of said path are simultaneously unoccupied; drive means for moving said platform carriages along said path and including an endless flexible sprocket chain, a plurality of first coupling means, one for each platform, fixed spaced from each other to said endless flexible sprocket chain, a plurality of second coupling means respectively fixed to said platform carriages and respectively adapted to be engaged by said first coupling means for coupling said platform carriages to said sprocket chain, guide means including four sprocket gears respectively arranged at corners of said rectangular path for guiding at any instant a plurality of first portions of said endless flexible sprocket chain substantially parallel to said rectangular path for keeping thereby the first coupling means fixed to said first portions of said sprocket chain engaged with the respective second coupling means, a plurality of deflector means respectively arranged along spaced points of said horizontal portions of said path for deflecting a plurality of second portions of said endless flexible sprocket chain transversely with respect to said first portions for disengaging the first coupling means fixed to said second portions from the respective second coupling means, said second portions having each a total length substantially equal to the length of said vertical portions of said rectangular path, and moving means connected to said endless flexible sprocket chain for continuously moving the same along said guide and deflector means.

6. A parking mechanism for automobiles or the like comprising, in combination, a stationary structure having a pair of spaced substantially horizontal guide rail means and a pair of spaced substantially vertical guide rail means shorter than said horizontal guide rail means and defining with the latter a substantially rectangular path; a plurality of platform carriages having each roller means engaging said guide rail means for guiding said platform carriages parallel to themselves along said rectangular path, said plurality of platform carriages arranged on said guide rail means so that two diagonally opposite corners of said path are simultaneously unoccupied; and drive means for moving said platform carriages along said path and including endless flexible conveyor means, a plurality of first coupling means, one for each platform, fixed spaced from each other to said endless flexible conveyer means, a plurality of second coupling means respectively fixed to said platform carriages and respectively adapted to be engaged by said first coupling means for coupling said platform carriages to said conveyer means, guide means for guiding at any instant a plurality of first portions of said endless flexible conveyer means substantially parallel to said rectangular path for keeping thereby the first coupling means fixed to said first portions of said conveyer means engaged with the respective second coupling means, a plurality of deflector means respectively arranged along spaced points of said horizontal portions of said path for deflecting a plurality of second portions of said endless flexible conveyor means having each a total length substantially equal to said length of said vertical guide rail means transversely with respect to said first portions for disengaging the first coupling means fixed to said second portions from the respective second coupling means, and means connected to said endless flexible coveyer means for continuously moving the same along said guide and deflector means.

7. A parking mechanism as set forth in claim 6 in which said roller means for each platform carriage includes a pair of upper rollers and a pair of lower rollers and in which each of said vertical guide rail means includes a pair of transversely spaced members respectively engaged by said pair of lower rollers during movement of the platform carriage along said vertical guide rail means.

8. A parking mechanism for automobiles or the like comprising, in combination, a stationary structure defining a rectangular path having a pair of substantially horizontal portions and a pair substantially vertical portions shorter than said horizontal portions; a plurality of platform carriages arranged on said stationary structure for movement parallel to themselves along said rectangular path and in such a manner that two diagonally opposite corners of said path are simultaneously unoccupied; drive means for moving said platform carriages along said path and including an endless flexible sprocket chain, a plurality of first coupling means, one for each platform, fixed spaced from each other to said endless flexible sprocket chain, a plurality of second coupling means respectively fixed to said platform carriages and respectively adapted to be engaged by said first coupling means for coupling said platform carriages to said sprocket chain, guide means including four sprocket gears respectively arranged at corners of said rectangular path for guiding at any instant a plurality of first portions of said endless flexible sprocket chain substantially parallel to said rectangular path for keeping thereby the first coupling means fixed to said first portions of said sprocket chain engaged with the respective second coupling means, a plurality of deflector means respectively arranged along spaced points of said horizontal portions of said path for deflecting a plurality of second portions of said endless flexible sprocket chain transversely with respect to said first portions for disengaging the first coupling means fixed to said second portions from the respective second coupling means, said second portions having each a total length substantially equal to the length of said vertical portions of said rectangular path, each of said deflector means including three rotary sprocket gears two of which are mounted closely spaced from each other along said horizontal portions of said path and the third being arranged between said two sprocket gears and vertically spaced therefrom between said horizontal portions of said path so that each of said second portions of said endless flexible sprocket chain forms a loop extending transversely and substantially vertical to said horizontal portions of said path, and moving means connected to said endless flexible sprocket chain for continuously moving the same along said guide and deflector means.

9. A parking mechanism as set forth in claim 8 in which each of said first coupling means includes a pin extending transverse to the elongation of said endless flexible sprocket chain and in which each of said second coupling means includes a fork-shaped member mounted on the respective platform carriage for pivotal movement about a pivot axis and having a slot open at one end so that a pin of said first coupling means may enter said slot to couple said first and said second coupling means and so that said pin may leave said slot to disengage said coupling means from each other; and cooperating means on said second coupling means and said guide rail means for maintaining said fork-shaped member during movement of the respective platform carriage along said horizontal guide rail means in such a position that said open end of said slot faces toward said third sprocket gear.

10. A parking mechanism as set forth in claim 9 in which said cooperating means comprise a pair of rollers respectively located on said opposite sides of said pivot axis and connected to said fork-shaped member, and guide surfaces on said guide rail means engaged by said rollers and arranged for causing said fork-shaped member to turn about the pivot axis thereof through an angle of 90° when the respective platform carriage passes over the corners of said rectangular path.

11. A parking mechanism for automobiles or the like, comprising, in combination, a stationary structure defining a rectangular path; a plurality of platform carriages arranged on said stationary structure in such a manner that two diagonally opposite corners of said rectangular path are simultaneously unoccupied, said carriages mounted on said stationary structure for movement in one direction parallel to themselves along said rectangular path; drive means for moving said platform carriages along said path and including endless flexible conveyor means mounted for movement along said path, a plurality of first coupling means, one for each platform carriage, fixed spaced from each other to said endless flexible conveyor means, a plurality of second coupling means respectively fixed to said platform carriages and respectively adapted to engage said first coupling means for coupling said platform carriages to said conveyor means, and moving means connected to said endless flexible conveyor means for continuously moving the same in said one direction; and means cooperating with said coupling means for keeping the second coupling means on the two platform carriages preceding in said one direction said two diagonally opposite corners engaged with the corresponding first coupling means and for disengaging the second coupling means on the other platform carriages from the first coupling means until said two platform carriages have each moved from one corner of said rectangular path into the corner adjacent thereto.

12. A parking mechanism for automobiles or the like, comprising, in combination, a stationary structure defining a rectangular path having a pair of longer substantially horizontal portions and a pair of shorter substantially vertical portions; a plurality of platform carriages arranged on said horizontal portions of said stationary structure in such a manner that two diagonally opposite corners of said rectangular path are simultaneously unoccupied, said carriages mounted on said stationary structure for movement in one direction parallel to themselves along said rectangular path; drive means for moving said platform carriages along said path and including endless flexible conveyor means mounted for movement along said path, a plurality of first coupling means, one for each platform carriage, fixed spaced from each other to said endless flexible conveyor means, a plurality of second coupling means respectively fixed to said platform carriages and respectively adapted to engage said first coupling means for coupling said platform carriages to said conveyor means, and moving means connected to said endless flexible conveyor means for continuously moving the same in said one direction; and means cooperating with said coupling means for keeping the second coupling means on the two platform carriages preceding in said one direction said two diagonally opposite corners engaged with the corresponding first coupling means and for disengaging the second coupling means on the other platform carriages from the first coupling means until said two platform carriages have respectively moved from off said portions of said path to a portion adjacent thereto.

13. A parking mechanism for automobiles or the like, comprising, in combination, a stationary structure defining a rectangular path having a pair of substantially horizontal portions and a pair of substantially vertical portions; a plurality of platform carriages arranged on said horizontal portions of said stationary structure in such a manner that two diagonally opposite corners of said rectangular path are simultaneously unoccupied, said carriages mounted on said stationary structure for movement in one direction parallel to themselves along said rectangular path; drive means for moving said platform carriages along said path and including endless flexible conveyor means mounted for movement along said path, a plurality of first coupling means, one for each platform carriage, fixed spaced from each other to said endless flexible conveyor means, a plurality of second coupling means respectively fixed to said platform carriages and respectively adapted to engage said first coupling means for coupling said platform carriages to said conveyor means, and moving means connected to said endless flexible conveyor means for continuously moving the same in said one direction; and means for guiding said endless flexible means in such a manner so as to keep the second coupling means on the two platform carriages preceding in said one direction said two diagonally opposite corners engaged with the corresponding first coupling means and so as to keep the second coupling means on the other platform carriages disengaged from the first coupling means until said two platform carriages have respectively moved from off said portions of said path to a portion adjacent thereto.

References Cited in the file of this patent

UNITED STATES PATENTS

| 2,358,507 | Haberstump | Sept. 19, 1944 |
| 2,761,572 | Baker | Sept. 4, 1956 |